United States Patent
Vyhnalek

[11] 3,913,471
[45] Oct. 21, 1975

[54] MATURING CHEESE
[76] Inventor: Milan Vyhnalek, 2 Crown St., Burnie, Tasmania, Australia
[22] Filed: Jan. 18, 1974
[21] Appl. No.: 434,727

[30] Foreign Application Priority Data
Jan. 23, 1973 Australia............................ 2002/73

[52] U.S. Cl. .................... 99/452; 99/461; 214/1 Q
[51] Int. Cl.² ............................................. A01J 25/16
[58] Field of Search............. 99/452, 324, 396–397, 99/421 P, 423, 462, 464, 472, 473, 474, 504–505, 461; 211/47, 70, 79–81, 164; 214/1 Q, 62 R

[56] References Cited
UNITED STATES PATENTS

| | | | |
|---|---|---|---|
| 592,691 | 10/1897 | Cazalet................................ 99/473 |
| 1,995,551 | 3/1935 | Shodron............................ 99/473 X |
| 2,001,628 | 5/1935 | Nierinck........................... 99/472 X |
| 2,179,327 | 11/1939 | Evans................................ 99/472 X |
| 2,387,621 | 10/1945 | Stangle ................................ 99/397 |
| 2,629,311 | 2/1953 | Graves................................. 99/472 |
| 2,702,943 | 3/1955 | Persson........................... 214/1 Q X |
| 2,744,325 | 5/1956 | Eales et al. ..................... 211/164 X |

Primary Examiner—Billy J. Wilhite
Assistant Examiner—Arthur O. Henderson
Attorney, Agent, or Firm—Elliott I. Pollock

[57] ABSTRACT

Apparatus for maturing rinded cheese such as the Gouda variety including a series of tunnels having groups of cheese storage racks mounted on rails in the tunnels, each rack including means to invert the racks facilitating periodic inversion within the tunnels including maintaining circulating gases in the tunnels at substantially constant temperature and humidity within the closed tunnels.

4 Claims, 4 Drawing Figures

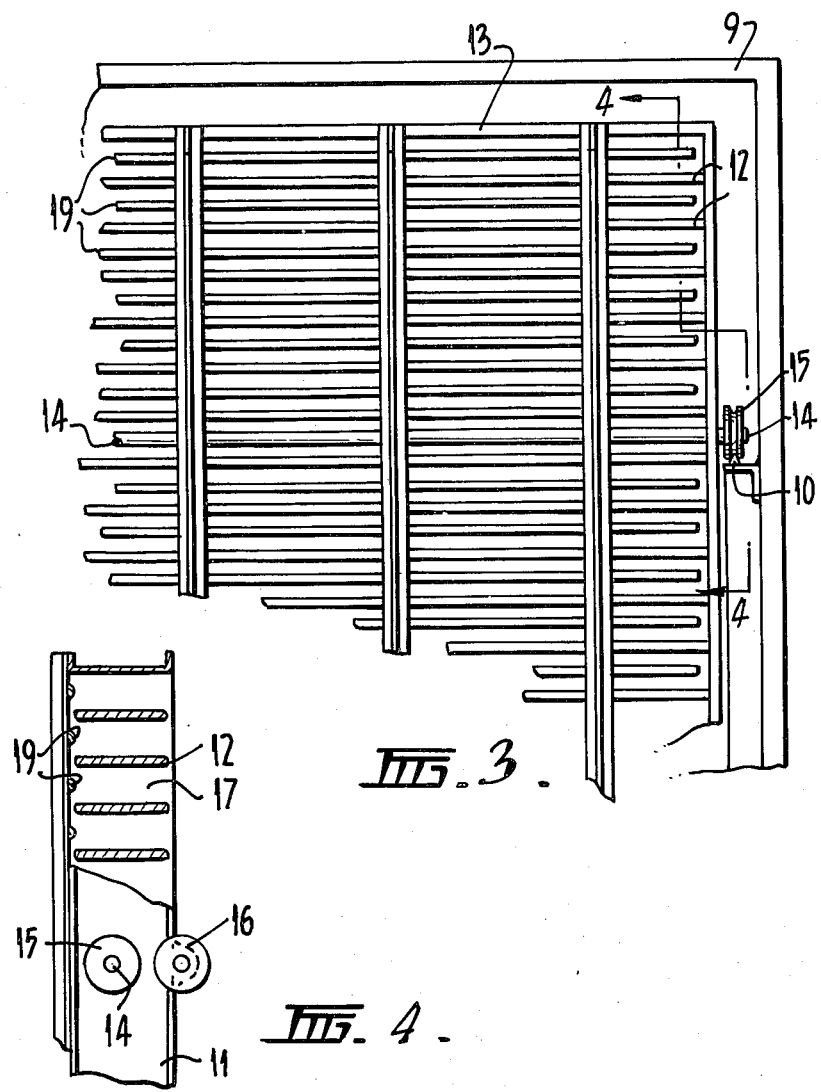

MATURING CHEESE

This invention relates to cheese manufacture and particularly to the production of socalled "rinded" cheese. Rinded cheeses, for example the Gouda variety, require a period of storage for development of the rind during maturation and to facilitate the development of a satisfactory rind without the growth of mould, great care has to be taken with the cheese, the storage equipment and its environment.

It is necessary for the cheese to be stored during maturation in an atmosphere of constant temperature and humidity, and for individual loaves of cheese to be regularly turned. The turning is necessary to ensure development of an even rind thickness over the loaf surface. The loaves are normally stored on wooden shelves and turning of each individual loaf is carried out manually. In large volume production, the turning operation is very onerous, tedious and expensive due to the large manpower involvement.

It is, accordingly, the principal objective of this invention to substantially mechanize the rinding process with a consequent reduction in manpower involvement and improvement in the overall quality of the matured cheese.

With the above stated principal objective in view, there is provided according to the invention apparatus for use in maturing rinded cheese comprising at least one storage chamber, a group of cheese storage racks mounted within the or each chamber, each rack including means to facilitate its periodic inversion within the chamber(s), and means for circulating air or other gaseous medium throughout the chamber(s) to maintain an atmosphere of substantially constant temperature and humidity therewithin.

Conveniently, a plurality of chambers in the form of tunnels may be juxtaposed in groups of two, four, six, etc. dependent upon the production requirements. Each rack may be removed bodily from the tunnel for loading and unloading of cheese and to facilitate these actions the racks may be provided with wheels or rollers running on rails fitted within the tunnels, and each tunnel or group of tunnels may be fitted with mechanical handling means for raising and lowering the racks to and from the rails.

A practical arrangement of the invention will now be described with reference to the accompanying drawings in which:

FIG. 3 is a detailed front elevation, in part, of one of the storage racks shown in FIG. 2; and FIG. 4 is a detailed end elevation in part, of the rack shown in FIG. 2.

Figure 1:
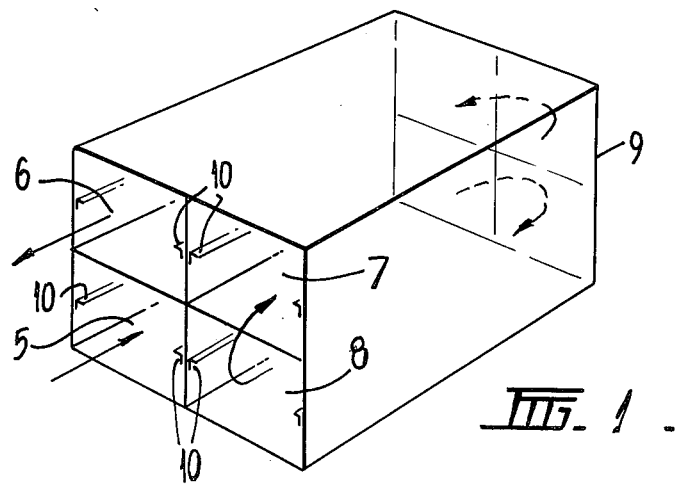
FIG. 1 is a diagrammatic view of a storage arrangement incorporating the invention.
Figure 2:
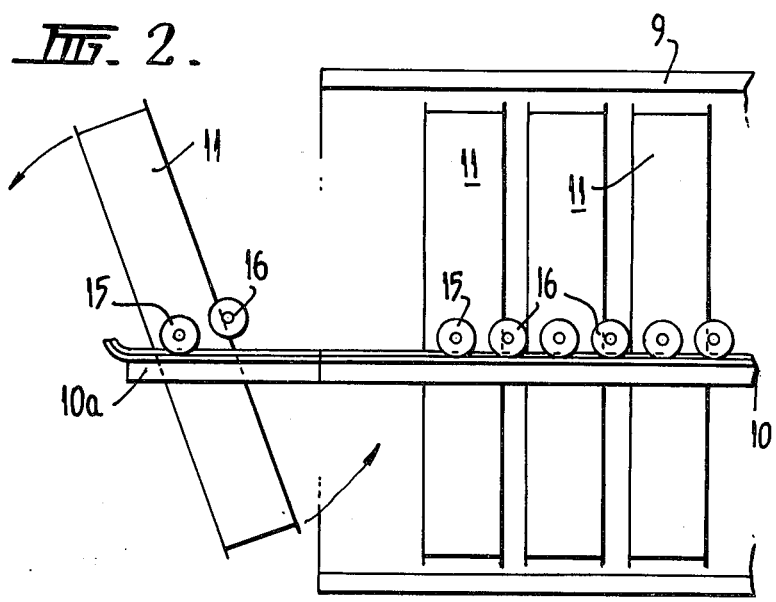
FIG. 2 is an end view of a group of storage racks in accordance with the invention.

Referring now to the drawings, a group of four insulated tunnels 5, 6, 7 and 8 formed from a frame 9 of structural steel lined with insulating panels are provided, arranged in two double storied groups as shown diagrammatically in FIG. 1, with an upper and lower service way (not shown) associated with each group. The tunnels may also be formed from brick or reinforced concrete if this is desired. On the opposed walls of each tunnel a rack supporting rail 10 is mounted between the floor and the ceiling. At one end of the array of tunnels a loading space (not shown) is included within the insulated enclosure of the construction and a movable hydraulically operated lift platform (not shown) is located therein to service the four tunnels. Fitted within each tunnel is a group of upstanding cheese supporting racks 11, each rack having a plurality of horizontally extending shelves 12, open on either side to permit air circulation. The racks 11 are formed with metal frames 13 and the shelves 12 constructed from wood. The racks 11 are so designed that they can easily be handled by forklifts. Each side wall of each rack is fitted with a roller 15 slightly offset from the horizontal axis of the rack, and these rollers are fixed to and linked by an axle 14 and engage the wall mounted rails 10 such that the racks may be moved along the rails without skewing. A pair of unlinked stabilizing rollers 16 are also provided on each rack 11, as shown in FIGS. 2 and 4.

When the shelves 12 are loaded with cheese loaves to a capacity, for example, of one ton of cheese per rack, the racks are lifted into position in the tunnels by the hydraulic lifting platform and rolled on the rails 10 into the tunnels until each tunnel space is fully occupied by loaded racks. Air is then circulated by conventional means throughout the tunnel array, in a path indicated by the arrows in FIG. 1 and the humidity and temperature carefully controlled to achieve optimum maturing conditions. If desired, other protective gases, such as nitrogen or carbon dioxide may be added to the air to reduce its oxygen content with a view to inhibiting mould growth and producing a softer rind formation on the cheeses stored in the tunnels.

The space 17 between each shelf 12 on the racks 11 is maintained at a minimum and similarly, the racks fit neatly into the tunnels with a minimum space 18 left unused. This results in a small available air space for the circulating gases and these gases are therefore always in close contact with the cheese loaves. This efficiency of design also means that the air conditioning equipment used can be operated at peak efficiency.

Periodically, each rack in each tunnel is inverted to displace each cheese loaf stored therein, and by careful design of the racks and the offsetting of the supporting rollers, this action may be readily carried out by a single operator. Battens 19 are provided at the back of the racks to prevent cheese loaves falling from the racks during inversion.

To further facilitate the rack turning operation, a hydraulically or pneumatically operated lever device (not shown) may be provided on an extension of the axle 14. The rack inverting operation is effected by first moving one of the racks along the rails from the racks remaining in the tunnel onto the extension 10a, inverting it in the available space provided, and then repeating the operation for each remaining rack, as shown in FIG. 2, with the operator working in the available space and slowly moving through the tunnel until he reaches the other end. The rail extension 10a may be withdrawn and extended telescopically to conserve space within the tunnel. Where the lever device is provided, the operator need not enter the tunnel, the inversion being performed from a position outside the tunnel.

It is envisaged that the rack turning operation may be completely mechanized if desired, by the use of mechanical lever systems, chain driven gearing or any known suitable means.

During the maturation period, the tunnel array is sealed from atmosphere by air tight doors, air curtains or the like, and in the case where a reduced oxygen atmosphere is used within the tunnels, suitable control equipment is provided to adjust the atmosphere to a safe concentration when an operator is effecting the turning operation described. During this period, the racks are inverted daily.

Perspex windows and/or doors may be fitted in the walls of the tunnels to facilitate inspection of the cheese loaves. The tunnels can be conveniently arranged to provide a dramatic space saving compared with prior art maturing methods, only access to the ends of the tunnels being necessary rather than access to each individual loaf as required in the prior art. This represents about a 75% saving in space compared with conventional methods and about an 80% reduction in cost.

I claim:

1. A cheese maturation apparatus comprising at least one elongated tunnel having insulating walls, a pair of rails extending horizontally along the opposing side walls of said tunnel, a plurality of vertically extending cheese storage rack units movably mounted on said rails in closely adjacent side-by-side relation to one another within the tunnel to substantially fill the tunnel, the cross-sectional area of each rack unit substantially conforming to the cross-sectional area of said tunnel, said tunnel including space to allow the sequential inversion of each rack about its rail mount, the rail mount for each rack unit including a pair of rollers on each side thereof engageable with said rails to permit said unit to be moved along said rails and to facilitate periodic inversion of each rack unit and to stabilize said unit, each of said rack units including a plurality of horizontally extending superposed shelves for the storage of cheese loaves thereon, the rack units being open at both ends of each shelf to allow free circulation of atmosphere through said units past the stored cheese loaves, each of said rack units having battens between adjacent pairs of said shelves respectively to prevent the falling of cheese loaves from said storage shelves during inversion of said rack unit, means for circulating a gaseous medium through the tunnel from one end to the other of said tunnel, and control means for maintaining substantially constant the temperature, humidity, and gaseous constituents within said tunnel.

2. The apparatus of claim 1 wherein a plurality of said tunnels are provided in juxtaposed relation, said means for circulating being operative to circulate said gaseous medium through said juxtaposed tunnels in a predetermined continuous sequence.

3. The apparatus of claim 1 wherein said rails include extensions protruding to the exterior of one end of said tunnel to permit the rack units to be bodily removed from said tunnel along said extensions thereby to permit loading and unloading of said rack units at a position exterior of said tunnel.

4. The apparatus of claim 1 in which said pair of rollers on each side of each said rack unit comprises a first roller which acts as a pivoting and supporting roller and a second roller, displaced from said first roller, which stabilizes said rack unit and acts to limit the inversion movement of said rack unit.

* * * * *